March 18, 1952  G. A. ROBERTS  2,589,866
AUTOMOBILE VISOR
Filed Oct. 23, 1948
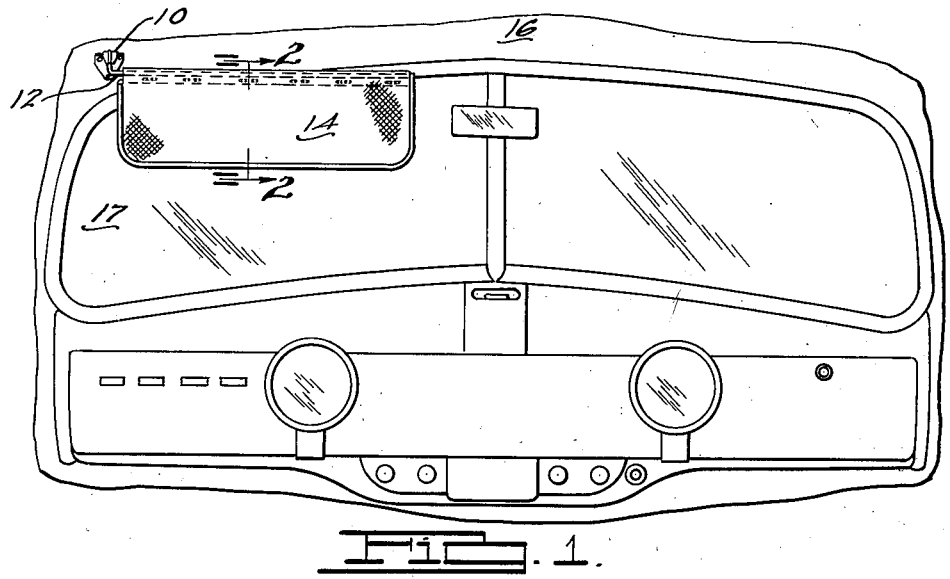
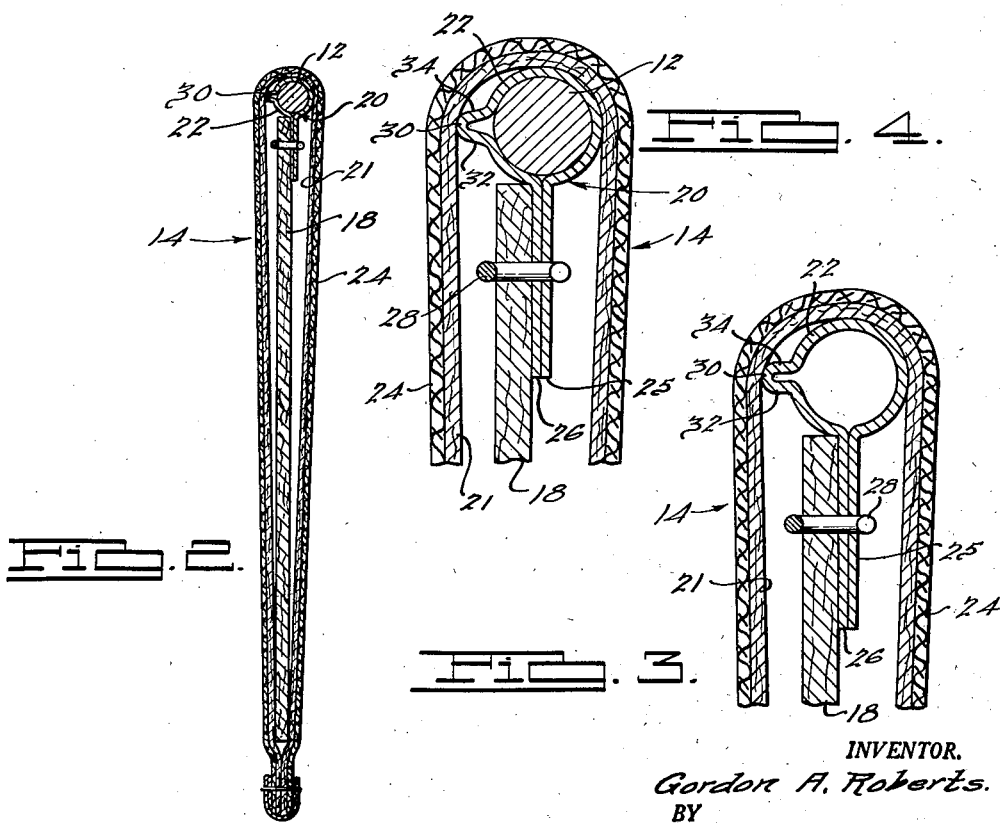
INVENTOR.
Gordon A. Roberts.
BY
Harness, Dickey & Pierce
ATTORNEYS.

Patented Mar. 18, 1952

2,589,866

UNITED STATES PATENT OFFICE 2,589,866

AUTOMOBILE VISOR

Gordon A. Roberts, Grosse Pointe, Mich.

Application October 23, 1948, Serial No. 56,126

4 Claims. (Cl. 296—97)

The present invention relates to automobile visors and more particularly to an improved automobile visor of the type conventionally mounted within the passenger compartment of an automobile and movable into and out of an operative position for shielding the eyes of an occupant thereof from offensive light rays.

It is an object of the invention to provide an improved automobile visor of the above mentioned type which is simple in construction, economical of manufacture and reliable and efficient in operation.

It is a further object of the invention to provide such an automobile visor having an improved means for yieldably supporting the visor element thereof in any desired adjusted position.

Other and more detailed objects of the invention will become apparent from a consideration of the accompanying drawing, the following specification and the appended claims.

In the drawing:

Figure 1 is a broken elevational view of the interior of an automobile body showing a visor constructed according to the present invention mounted thereon;

Fig. 2 is an enlarged sectional view of the visor construction illustrated in Fig. 1 taken along the line 2—2 thereof;

Fig. 3 is a greatly enlarged broken sectional view showing the visor element prior to assembly with the supporting rod; and, Fig. 4 is a view similar to Fig. 3 showing the visor element assembled with the supporting rod.

Referring to the drawing, the automobile visor there illustrated comprises a supporting bracket 10, an L-shaped supporting rod 12 one arm of which is pivotally supported in the bracket 10, and the other arm of which carries a visor element 14 which may be moved pivotally about the rod 12 as desired. In accordance with conventional practice the visor, when intended for the use of the driver of a conventional left-hand drive automobile, is mounted on the automobile 16 by securing the bracket 10 to the vehicle body adjacent the upper left hand corner of the windshield 17, in the position illustrated in Fig. 1 of the drawing.

It will be appreciated from a complete understanding of the present invention that the visor element 14 may be either opaque or may be constructed to permit the passing of only part of the light rays. In the preferred embodiment illustrated the visor element 14 comprises a flat generally rectangular member 18 formed of cardboard or other suitable material, a hinge member 20 mounted on the member 18 and extending along one edge thereof, an outer element 21 of lighter weight cardboard or other suitable material wrapped about the member 18 and the hinge member 20, and an outer cover of upholstery cloth 24 to provide the desired appearance.

In the preferred embodiment illustrated in the drawing the hinge member 20 is formed of sheet metal and comprises a generally tubular portion 22 and registering flange portions 25 and 26. The hinge member 20 is disposed with the flange portions 25 and 26 extending along one side of the member 18 and the tubular portion 22 extending along the adjacent edge of the board 18, and is secured thereto by staples 28 extending through the flanges 25 and 26 and through the member 18. The tubular portion 22 is generally circular in cross section with the exception that at one point the wall is deformed radially outwardly and sharply folded upon itself to form a radially outwardly projecting longitudinally extending bead 30. This bead 30 comprises two generally radially extending wall portions 32 and 34 which are integrally connected at their radially outer ends and which at their radially inner ends are integral with the tubular portion 22 at opposite sides of the bead 30. Prior to assembly of the visor element 14 with the supporting rod 12 the opposite wall portions 32 and 34 of the longitudinally extending bead 30 are disposed in close proximity and in substantially parallel relation. Also, prior to assembly the internal diameter of the tubular portion 22 is slightly less than the outside diameter of the rod 12. In assembling the visor element 14 and the supporting rod 12 the rod 12 is forced longitudinally into the tubular portion 22. This operation causes a slight opening of the longitudinally extending bead 30 causing its opposite wall portions 32 and 34 to diverge slightly as illustrated in Fig. 4 to accommodate the slightly larger diameter of the rod 12. It will now be appreciated that the tubular means 22 may be formed of any suitable material having sufficient resiliency such that upon assembly in this manner the tubular means 20 will continuously grip the rod 12 to support the visor element 14 in any desired adjusted position without preventing the manual pivotal movement of the visor element 14 from one desired position to another. In the preferred embodiment illustrated an aluminum alloy is employed.

While only one specific embodiment of the invention has been illustrated and described in detail, it will be readily appreciated by those skilled in the art that numerous modifications and changes may be made therein without departing from the spirit of the present invention.

What is claimed is:

1. An automobile visor comprising a bracket adapted to be secured to the body of an automobile in desired predetermined relation, a rod pivotally supported by said bracket and circular in cross section, and visor means mounted on said rod for pivotal movement relative thereto, said means including means telescopically receiving and yieldably gripping said rod and adapted to permit said visor means to be manually adjusted to any desired pivotal position relative to said rod and to yieldably support said visor means in said position, said last named means including a strip of resilient material formed to define a generally cylindrical wall having a longitudinally extending outwardly projecting bead longitudinally coextensive with said wall and including a pair of generally radially extending walls integrally connected at their radially outer ends and integral at their radially inner ends with said cylinder wall, said bead being opened during assembly of said visor means with said rod to increase the angle formed by said radially extending walls of said bead and effect said gripping of the latter.

2. An automobile visor comprising a bracket adapted to be secured to the body of an automobile in desired predetermined relation, a rod pivotally supported by said bracket and circular in cross section, a light shielding element, an elongated connector strip secured to said element telescopically receiving and gripping said rod and having a generally cylindrical wall and a longitudinally extending radially outwardly projecting bead portion, said bead portion having a pair of cooperating wall portions integrally connected at their outer ends and integral with said cylindrical wall at their inner ends, said bead being opened during assembly of said rod and said connector strip to increase the angle between said wall portions and effect said gripping of the rod.

3. An automobile visor element adapted to be pivotally mounted upon an elongated supporting rod, said visor element comprising a light shield, and a connector secured to said light shield, said connector comprising an elongated strip including registering peripheral flange portions and a central portion generally cylindrical in shape and including a longitudinally extending bead adapted to be deformed throughout its longitudinal extent by assembly of said visor element with said supporting rod and effect a gripping of said rod by said connector, said bead having substantially parallel and generally radially outwardly extending sides.

4. An automobile visor element adapted to be pivotally mounted upon an elongated supporting rod, said visor element comprising a light shield, and a connector secured to said light shield, said connector comprising an elongated strip including registering peripheral flange portions and a central portion the inner surface of which is generally cylindrical in shape except for a longitudinally extending radially outwardly projecting bead adapted to be opened by assembly of said visor element with said supporting rod and effect a gripping of said rod by said connector.

GORDON A. ROBERTS.

REFERENCES CITED

The following references are of record in the file of this patent:

UNITED STATES PATENTS

| Number | Name | Date |
| --- | --- | --- |
| 2,264,603 | Westrope | Dec. 2, 1941 |
| 2,441,780 | Van Dresser | May 18, 1948 |
| 2,458,677 | Brundage | Jan. 11, 1949 |
| 2,458,707 | Jacobs | Jan. 11, 1949 |